United States Patent [19]
Smith et al.

[11] 3,917,313
[45] Nov. 4, 1975

[54] MOTORCYCLE SUSPENSION SYSTEM

[75] Inventors: Fred W. Smith, West Bloomfield; Robert E. Jarman, Drayton Plains; Russell L. Shreve, Troy, all of Mich.

[73] Assignee: Bultaco, Compania Espanola Espanola De Motores, S.A., Barcelona, Spain

[22] Filed: Dec. 17, 1973

[21] Appl. No.: 425,104

[52] U.S. Cl. .............. 280/284; 180/32; 180/73 TL; 280/288
[51] Int. Cl.² ......................................... B62K 25/20
[58] Field of Search .......... 280/284, 285, 286, 288; 180/32, 73 TL

[56] References Cited
FOREIGN PATENTS OR APPLICATIONS

| | | |
|---|---|---|
| 767,101 | 1/1957 | United Kingdom ................. 280/284 |
| 852,278 | 1/1940 | France ............................... 280/285 |
| 950,983 | 9/1956 | Germany ............................. 180/32 |
| 1,051,861 | 1/1954 | France ............................... 180/32 |
| 458,416 | 3/1928 | Germany ............................. 280/285 |
| 496,852 | 12/1938 | United Kingdom ................. 280/285 |

Primary Examiner—David Schonberg
Assistant Examiner—John P. Silverstrim
Attorney, Agent, or Firm—Harness, Dickey & Pierce

[57] ABSTRACT

A rear wheel suspension system for a motorcycle embodying a pair of trailing links that define an instant link center that provides a relatively long pivotal radius for the rear wheel so as to permit increased suspension travel. The trailing links are oriented so as to provide the desired suspension characteristics. The instant link center in a preferred embodiment is disposed ahead of and above the axis of rotation of the front wheel.

5 Claims, 2 Drawing Figures

MOTORCYCLE SUSPENSION SYSTEM

BACKGROUND OF THE INVENTION

This invention relates to a suspension system for a motorcycle and more particularly to an improved suspension system for the rear wheel of a motorcycle.

Motorcycle rear wheel suspension systems presently in commercial use employ a single trailing link and the rotational axis of the wheel lies on one of the link pivot axes. The design of the motorcycle dictates the use of a relatively short trailing link. Because of this it is impossible to permit large wheel travels when bumps are encountered and high spring rates must be employed to prevent bottoming on rough surfaces. Such high spring rates result in a very hard ride and a reduction in the degree of control of the motorcycle. Furthermore, the use of a single trailing link restricts the ability to control the relative degrees and levels of anti squat during acceleration and anti lift during braking. Specifically, these characteristics vary during the range of suspension travel with single link suspension.

It is, therefore, a principal object of this invention to provide an improved motorcycle wheel suspension.

It is another object of this invention to provide a rear wheel suspension system for a motorcycle that permits large wheel travels.

It is a still further object of this invention to provide a motorcycle rear wheel suspension system that permits the desired anti lift and anti squat characteristics and permits these controls during a greater length of suspension travel.

It is yet another object of the invention to provide a rear wheel suspension system for a motorcycle embodying a linkage system in which the linkage system defines a common instant center during both acceleration and braking.

It is a further object of the invention to provide a motorcycle rear wheel suspension embodying a linkage system in which the rotational axis of the suspended wheel does not lie on a pivot center of the linkage system.

SUMMARY OF THE INVENTION

This invention is adapted to be embodied in a suspension system for a motorcycle having a frame and front and rear wheels. The suspension system suspends one of the wheels from the frame and comprises a hub carrier for the one wheel. A linkage system connects the hub carrier to the frame. The rotational axis of the suspended wheel does not lie on any pivot axis of the linkage system.

DETAILED DESCRIPTION OF THE PREFERRED EMBODIMENTS

Figure 1:
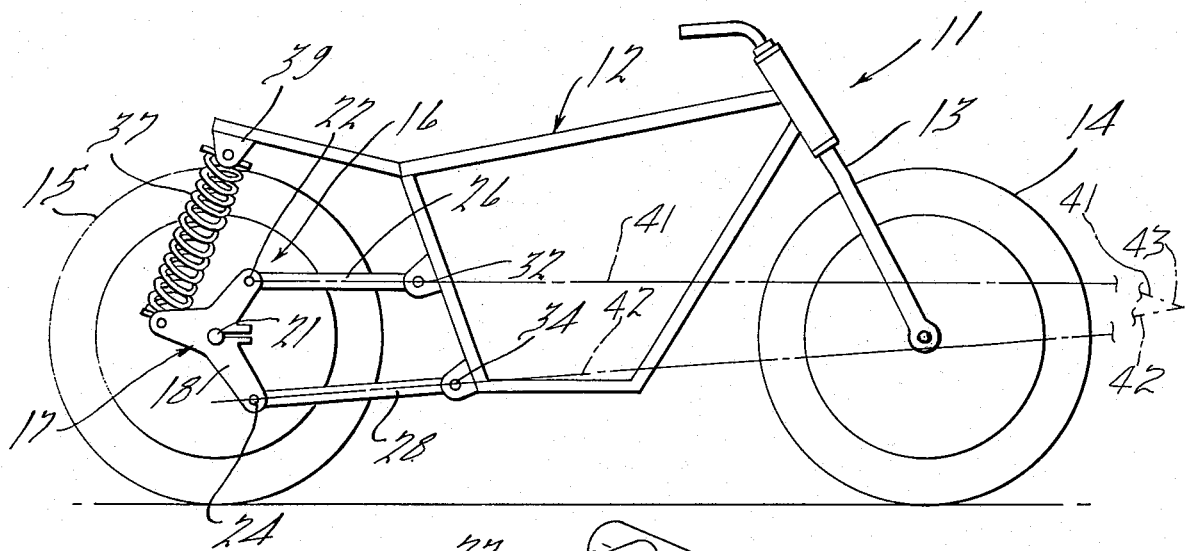
FIG. 1 is a partly schematic side elevational view of a motorcycle embodying the invention, with the portions of the motorcycle which form no part of the invention deleted for clarity.

In FIG. 1 a motorcycle embodying this invention is identified generally by the reference numeral 11. The showing of the motorcycle 11 is generally schematic and such things as the motor, transmission, etc., which form no part of the invention have been deleted for clarity.

The motorcycle 11 is comprised of a frame assembly 12 that is made up primarily of a number of tubes welded together. The frame 12 carries a front fork 13 which is journaled in the frame 12 and which, in turn, rotatably carries a front wheel 14. The front fork 13 may be connected to the frame 12 by any known type of suspension system.

Figure 2:
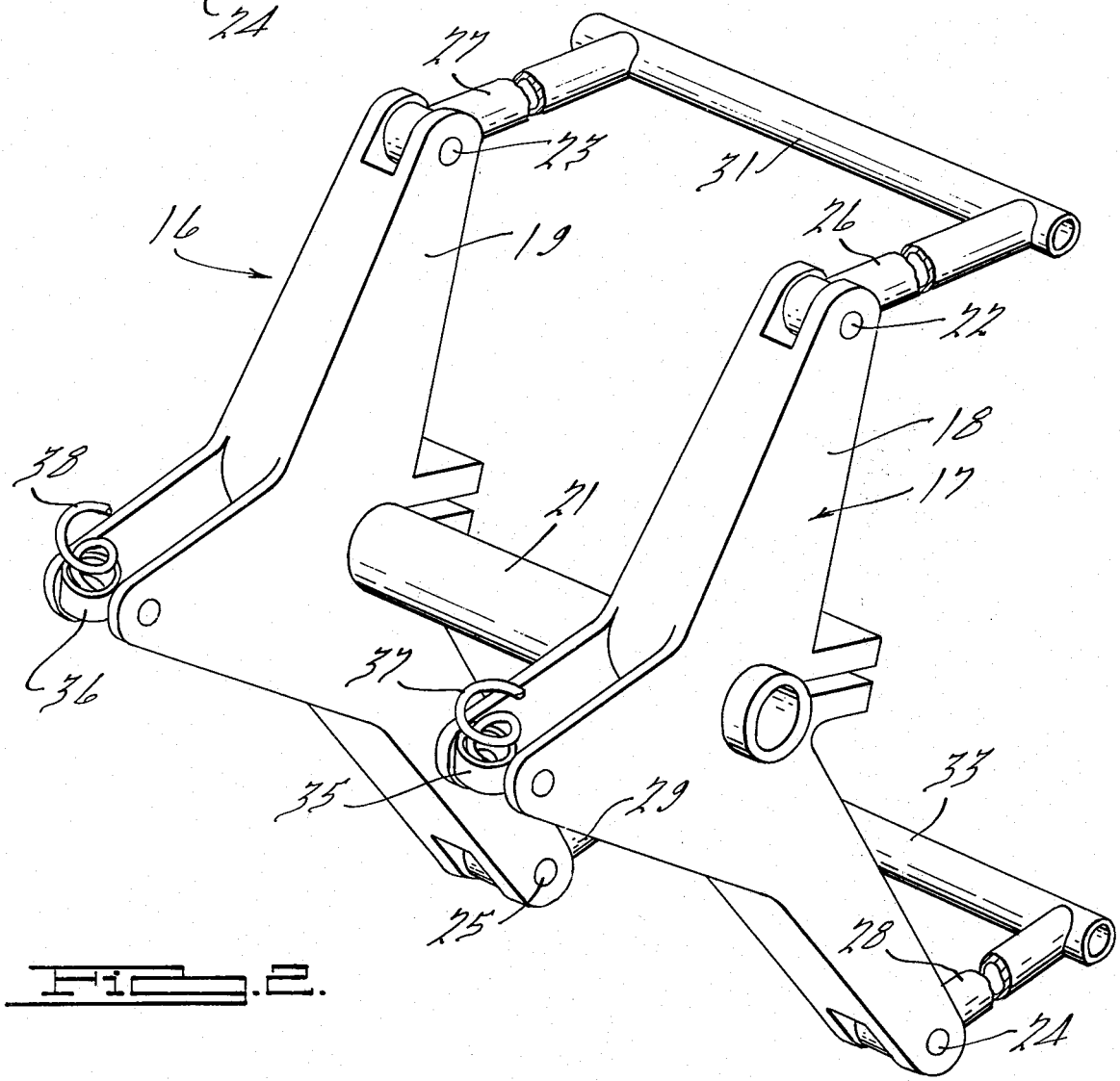
FIG. 2 is a perspective view of the rear wheel suspension, with the rear wheel removed to show the details of the construction.

A rear wheel 15 is suspended relative to the frame 12 by a suspension system, indicated generally by the reference numeral 16, which is partially shown in FIG. 2, and which embodies this invention.

The suspension system 16 includes a hub carrier assembly 17 having a pair of formed arms 18 and 19 that are affixed to opposite ends of a shaft 21, which shaft rotatably journals the wheel 15 via bearings (not shown). The arms 18 and 19 extend upwardly and downwardly from the rotational axis defined by the shaft 21 and each carries respective upper and lower pivot pins 22, 23 and 24, 25. The pivot pins 22, 23, 24 and 25 are spaced from the rotational axis defined by the shaft 21 and in the illustrated embodiment the rotational axis is positioned between the upper and lower pivot pins 22, 23 and 24, 25.

At each side of the wheel 15, one end of respective pairs of upper trailing links 26 and 27 and lower trailing links 28 and 29 are pivotally connected to the arms 18 and 19 by the pivot pins 22, 23, 24 and 25. At their forward ends, the trailing links 26 and 27 are welded to a common tubular member 31, which tube is pivotally journaled on the frame 12 by means of a pivot shaft 32. In a like manner the forward ends of the trailing links 28 and 29 are welded to the tube 33 which is, in turn, journaled on the frame 12 by means of a pivot pin 34. The fabricated structure of the trailing arm assembly provides a relatively rigid arrangement that is capable of preventing lateral deflections of the rear wheel 15 relative to the frame 12. Thus, the rear wheel 15 is accurately located relative to the frame 12.

Each of the arms 18 and 19 provides a respective socket or cup 35 and 36 that receives the lower end of a combined spring and shock absorber assembly 37 and 38. The upper ends of the assemblies 37 and 38 are connected to the frame 12 in any suitable manner, by means of brackets 39. Thus, the combined shock absorber and spring assemblies 37 and 38 control the movement of the wheel 15 relative to the frame assembly 12.

The trailing arms or links 26, 27 and 28, 29 extend at an angle to each other and if extended these links would intersect each other at a point ahead of the rotational axis of the front wheel 14. As shown in FIG. 1, the links 26 and 27 define an imaginary line 41 which extends forwardly of the motorcycle frame 12. In a like manner, the links 28 and 29 define an imaginary line 42 that also extends forwardly. The lines 41 and 42 intersect at a point 43. This point is the instant link center and is the same regardless of whether the motorcycle is accelerating or decelerating. In the illustrated embodiment the instant link center lies above and ahead of the rotational axis of the front wheel. The described linkage system provides a long effective link center that permits large degrees of wheel movement with only small changes in the anti lift and anti squat characteristics during the range of wheel movement. The desired relationship and control between anti lift and anti squat can be obtained with this system. Although these characteristics are obtained with the specific linkage system described, it should be understood that these characteristics can be accomplished with other linkage systems and instant center locations, such variations being possible within the scope of the invention.

It is to be understood that the foregoing description is that of a preferred embodiment. Various changes and modifications may be made without departing from the spirit and scope of the appended claims.

We claim:

1. In a motorcycle having a frame, a front wheel and a rear wheel, the improvement comprising a suspension system for suspending said rear wheel from said frame, said suspension system comprising a hub carrier for said rear wheel, a first link, a first pivotal connection between said first link and said frame, a second pivotal connection between said first link and said hub carrier, a second link, a third pivotal connection between said second link and said hub carrier, and a fourth pivotal connection between said second link and said frame, said first, second, third and fourth pivotal connections being spaced from each other, said links being disposed at an angle relative to each other and defining an instantaneous link center about which said links effectively pivot, said instant link center being disposed ahead of and above the axis of said front wheel when the motorcycle is in an unladened condition.

2. A motorcycle as set forth in claim 1, further including spring means operatively interposed between the rear wheel and said frame for controlling the movement of the rear wheel relative to said frame.

3. A motorcycle as set forth in claim 1 wherein the second and fourth pivotal connections are spaced ahead of the first and third pivotal connections whereby said links are trailing links.

4. A motorcycle as set forth in claim 1 wherein the rotational axis of the suspended wheel is positioned between the first and third pivotal connections.

5. A motorcycle as set forth in claim 1 wherein the instant link center is the same regardless of whether the motorcycle is in an acceleration mode or a deceleration mode.

* * * * *